United States Patent
Brotz et al.

(10) Patent No.: US 8,479,245 B2
(45) Date of Patent: Jul. 2, 2013

(54) METHOD AND SYSTEM FOR RECEIVING AND PROCESSING DIGITAL CONTENT

(75) Inventors: Mario Udo Brotz, Mountain View, CA (US); David S. Wang, Fremont, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 764 days.

(21) Appl. No.: 11/378,895

(22) Filed: Mar. 17, 2006

(65) Prior Publication Data

US 2006/0161961 A1 Jul. 20, 2006

Related U.S. Application Data

(63) Continuation of application No. 09/766,183, filed on Jan. 18, 2001, now Pat. No. 7,039,929.

(51) Int. Cl.
*G06F 13/00* (2006.01)
*G06F 15/16* (2006.01)

(52) U.S. Cl.
USPC .............. 725/112; 725/9; 725/51; 709/217

(58) Field of Classification Search
USPC ........................................ 725/105, 109–134
See application file for complete search history.

(56) References Cited

U.S. PATENT DOCUMENTS

| | | | | |
|---|---|---|---|---|
| 5,465,113 A | 11/1995 | Gilboy | | 348/5.5 |
| 5,572,643 A | 11/1996 | Judson | | 395/793 |
| 5,592,551 A | 1/1997 | Lett et al. | | 380/20 |
| 5,657,072 A | 8/1997 | Aristides et al. | | 348/13 |
| 5,682,514 A * | 10/1997 | Yohe et al. | | 711/118 |
| 5,699,125 A * | 12/1997 | Rzeszewski et al. | | 725/50 |
| 5,701,161 A | 12/1997 | Williams et al. | | 348/468 |
| 5,708,825 A | 1/1998 | Sotomayor | | 395/762 |
| 5,710,601 A | 1/1998 | Marshall et al. | | 348/564 |
| 5,727,129 A * | 3/1998 | Barrett et al. | | 706/10 |
| 5,737,030 A | 4/1998 | Hong et al. | | 348/564 |
| 5,745,754 A | 4/1998 | Lagarde et al. | | 395/615 |
| 5,752,246 A | 5/1998 | Rogers et al. | | 707/10 |
| 5,797,001 A | 8/1998 | Augenbraun et al. | | |

(Continued)

FOREIGN PATENT DOCUMENTS

| | | | |
|---|---|---|---|
| EP | 0648054 A | 4/1995 | |
| WO | 9817064 A | 4/1998 | |
| WO | 9856188 A | 12/1998 | |

OTHER PUBLICATIONS

Proffit, B.; "Interfast Brings the Web to TV. A New Technology May Change the Way You Watch Television;" PC Magazine, A PC Communication Corp. New York, US, Jan. 21, 1997.

*Primary Examiner* — Vivek Srivastava
*Assistant Examiner* — Carmine Malangone
(74) *Attorney, Agent, or Firm* — John L. Rogitz

(57) ABSTRACT

Embodiments of the present invention are directed to a method of storing digital content in a digital electronic system. In one embodiment, datacast information decoded from a digital media signal is monitored to identify newly-received digital content. The monitoring includes configuring a decoder to receive and decode the datacast information, identifying newly-received digital content from the datacast information, and updating an intelligent filter based upon the newly-received digital content, wherein the intelligent filter records the newly-received digital content. Additionally, the monitoring may include repeating the configuring, identifying, and updating. Thereafter, any of the newly-received digital content that is recorded in the intelligent filter may be stored into a cache memory.

21 Claims, 9 Drawing Sheets

U.S. PATENT DOCUMENTS

| | | | |
|---|---|---|---|
| 5,818,441 A * | 10/1998 | Throckmorton et al. | 715/717 |
| 5,889,951 A | 3/1999 | Lombardi | 395/200.49 |
| 5,895,471 A | 4/1999 | King et al. | 707/104 |
| 5,929,849 A * | 7/1999 | Kikinis | 725/113 |
| 5,929,850 A | 7/1999 | Broadwin et al. | 345/327 |
| 5,978,828 A | 11/1999 | Greer et al. | 709/2.24 |
| 5,991,306 A * | 11/1999 | Burns et al. | 370/429 |
| 6,018,764 A * | 1/2000 | Field et al. | 709/217 |
| 6,240,555 B1 * | 5/2001 | Shoff et al. | 725/110 |
| 6,351,467 B1 * | 2/2002 | Dillon | 370/432 |
| 6,381,748 B1 * | 4/2002 | Lin et al. | 725/109 |
| 6,442,598 B1 * | 8/2002 | Wright et al. | 709/217 |
| 6,459,427 B1 * | 10/2002 | Mao et al. | 725/109 |
| 2002/0078467 A1 * | 6/2002 | Rosin et al. | 725/110 |

* cited by examiner

METHOD AND SYSTEM FOR RECEIVING AND PROCESSING DIGITAL CONTENT

This patent application is a Continuation of commonly-owned patent application Ser. No. 09/766,183, filed on Jan. 18, 2001, now U.S. Pat. No. 7,039,929 entitled "INTELLIGENT DEVICE HAVING BACKGROUND CACHING OF WEB PAGES FROM A DIGITAL TELEVISION BROADCAST SIGNAL AND METHOD OF SAME", by Mario Udo Brotz and David S. Wang, which is incorporated herein by reference, which is a Continuation of U.S. Pat. No. 6,374,404, filed on Dec. 16, 1998, entitled "INTELLIGENT DEVICE HAVING BACKGROUND CACHING OF WEB PAGES FROM A DIGITAL TELEVISION BROADCAST SIGNAL AND METHOD OF SAME", by Mario Udo Brotz and David S. Wang.

BACKGROUND OF THE INVENTION

1. Field of the Invention

The present invention relates to the field of digital television (DTV) systems and digital broadcasting. More specifically, the present invention relates to the fields of digital broadcasting and web browsing.

2. Related Art

Heretofore, television systems have mainly been used to receive and display broadcast television signals (e.g., audio/visual programs) for television viewers. In Europe, a data transmission format called "Teletext" has been used which enables compatible television sets to receive a special video signal having encoded therein pages of text based information that can be displayed to a viewer. The viewer can select to thereby view certain text-based pages from a keyboard console or remote device, which can include a cursor directing device. The text-based pages are broadcast from the television broadcaster and some high end television sets can store all the text-based pages in a memory device. Although helpful for obtaining mainstream information, e.g., stock prices and reports, sports information, general news, weather reports, etc., the Teletext system is very limited in the number of pages it can support, e.g., about 100 pages, is very limited in that only text is used and provides no intelligent information filtering mechanisms with respect to the text-based pages. It would be desirable to provide a system that can support enhanced information viewing and navigation within a television system.

In the United States, the digital satellite system (DSS) television broadcast standard offers an on-screen programming guide that decodes text-based programming information from the television broadcast signal. The DSS on-screen programming information describes the schedule of television programs and acts like an electronic television guide. Also included are some text-based extended information that describe the subject matter of a particular television show, program or movie. Much like the Teletext system, the DSS on-screen programming information is only text-based, it uses a television set, is limited in the number of pages it can support and provides no intelligent information filtering mechanisms. It would be desirable to provide a system that can support enhanced information viewing and navigation within a television system.

Recently, digital television broadcast standards and digital television sets have been introduced and used. The use of cable systems and digital audio/visual systems into the home has introduced the set-top-box device. The set-top-box device acts as an intelligent controller for accessing and decoding cable programs from digital cable, e.g., terrestrial cable or from a digital satellite system. In the recently proposed home audio/visual network systems, e.g., the HAVi and AV/C standards, the set-top-box also acts as an intelligent controller to control the activities and communications of other electronic devices that can be coupled to the network, like a digital television, a video cassette recorder (VCR), a compact disk (CD) unit, a tuner, a personal computer system, etc. These electronic platforms allow an enhanced ability to access and display information in digital form that was not before possible in the realm of television media. It would be desirable to provide a system that can take advantage of this enhanced ability to access and display digital information within a television system.

The internet protocol of the world wide web allows multiple computer systems to communicate and display information in a way not before possible. The internet protocol allows hypertext documents, e.g., documents in a hypertext markup language (HTML) format, to be communicated from a server to a client computer system for viewing and interaction therewith. In typical usage, a user interacts with a web browser of a host computer system that connects to the internet via a modem or via some other form of direct high speed digital connection. Once connected to the internet, the user can access information in the form of hypertext documents (web pages) that are stored on server computer systems located on the world wide web, which exists literally all over the globe. It would be desirable to provide a system that can take advantage of the enhanced ability to access and display digital information within a television system for displaying and accessing HTML documents.

SUMMARY OF THE INVENTION

Accordingly, the present invention takes advantage of the enhanced ability of a digital television system to access and display information to enhance a television viewer's entertainment and information gathering experience. The present invention provides a digital television (DTV) system capable of efficiently accessing and displaying viewer-selected web pages and other HTML documents to a viewer. The web pages and other HTML documents are sent over a digital broadcast to the DTV system of the present invention. These and other advantages of the present invention not specifically mentioned above will become clear within discussions of the present invention presented herein.

A client-side intelligent device having background caching of web pages within a digital television (DTV) system and method of same are described herein. The present invention includes a digital television system having an intelligent device for interfacing with a user/viewer and controlling the display of information on a display screen. The intelligent device, in one embodiment, is a set-top-box, but could be any intelligent electronic device or computer system. The set-top-box is configured to receive a digital TV broadcast signal (e.g., land based cable or digital satellite system) that may include audio/visual information as well as data signals in a datacast format. The datacast format includes web pages, e.g., in the HTML (hypertext markup language) format. The present invention allows a viewer to have his/her DTV set-top-box or HDTV (high definition TV) monitor and locally cache hypertext documents (and multi-media components), that are transmitted by digital broadcasters, to thereby enhance the internet connectivity performance. A forward caching process is used.

The DTV broadcasters support multiple channels of information on which digital content providers can supply a domain of web pages that are transmitted in round robin fashion on a periodic basis. The present invention is able to display viewer-selected hypertext documents on the DTV system from this domain. An intelligent filter is used to cache hypertext documents. The intelligent filter modifies itself based on user behavior, e.g., user history, and user preferences in terms of the web pages that a viewer routinely visits. The intelligent filter is used to identify certain web pages (or other HTML-based documents and multi-media components) of the data that are being broadcast and these identified web pages are stored in a cache memory for later use by the viewer. Hypertext documents are forward cached in that they are stored in the cache memory before they are displayed to the user. A second tuner can be used to poll multiple channels when updating the cached contents. Cached web pages avoid broadcast latencies (due to periodic updating) and thereby are displayed faster to the viewer. The use of cached web pages therefore enhances internet connectivity performance.

More specifically, embodiments of the present invention include a method of displaying information in a digital television system, the method comprising the steps of: a) maintaining an intelligent filter that records hypertext documents based on the frequency that hypertext documents were previously accessed by a viewer of the digital television system; b) monitoring datacast information decoded from a received digital television broadcast signal to identify newly received hypertext documents, the step b) comprising the steps of: b1) sequentially scanning a first tuner of the digital television system over channels of the digital television broadcast signal for a predetermined time period for each scanned channel; and b2) at each scanned channel, identifying newly received hypertext documents. The method further comprising the steps of: c) storing into a cache memory any of the newly received hypertext documents that are recorded in the intelligent filter; d) receiving, from a viewer, an identifier of a selected hypertext document; and e) provided the selected hypertext document is located within the cache memory, accessing the selected hypertext document from the cache memory and displaying the selected hypertext document on a display screen of the digital television system.

Embodiments include the above and further comprising the step of f) using a second tuner of the digital television system to display contents of a selected channel to the viewer on the display screen wherein the datacast information comprises a domain of hypertext documents that are periodically broadcast. Embodiments include the above and wherein the step a) comprises the steps of: a1) receiving and recording identifiers of hypertext documents accessed by the viewer; a2) recording a count associated with each identifier received by the step a1), the count indicating the number of times each recorded hypertext document was accessed by the viewer; and a3) ranking the identifiers of the intelligent filter based on their associated counts. Embodiments further include a digital television system implemented in accordance with the above.

DETAILED DESCRIPTION OF THE INVENTION

In the following detailed description of the present invention, an intelligent device within a digital television system for performing background caching of web pages, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within an intelligent electronic media device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a consumer electronic media device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "generating" or "calculating" or "determining" or "displaying" or the like, refer to the action and processes of a consumer electronic media device, or similar electronic computing device (e.g., dedicated or embedded computer system), that manipulates and transforms data. The data is represented as physical (electronic) quantities within the consumer electronic media device's registers and memories and is transformed into other data similarly represented as physical quantities within the consumer electronic media device memories or registers or other such information storage, transmission, or display screens.

Digital TV System

Figure 1A:
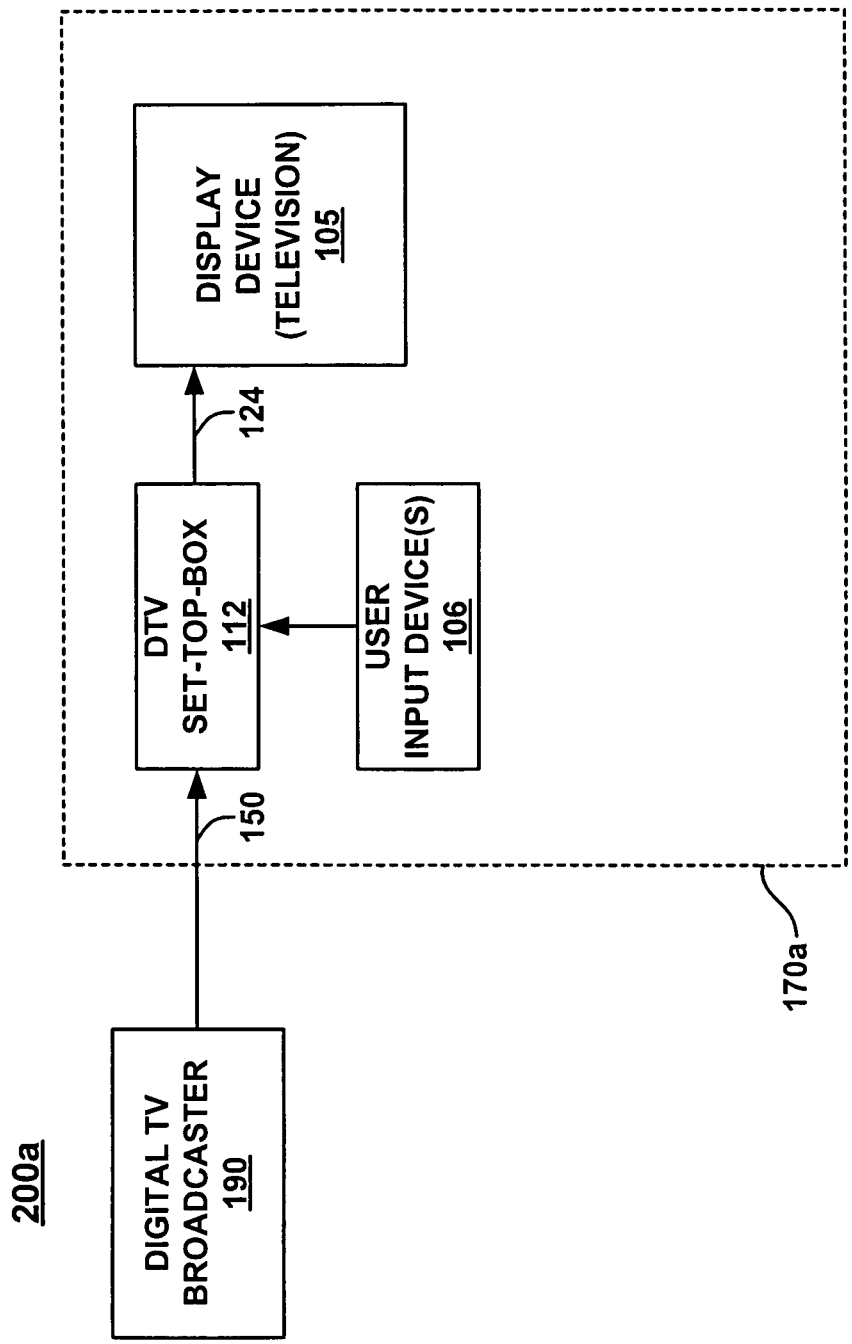
FIG. 1A illustrates a digital television system in accordance with one embodiment of the present invention.

FIG. 1A illustrates one embodiment of the client-side digital television ("DTV") system 170a of the present invention. DTV system 170a is coupled to receive a multi-channel digital television signal 150 from a digital TV broadcaster 190. Digital system 200a includes the broadcaster 190 and the client-side DTV system 170a. Within system 200a, the digital TV broadcast signal 150 can be delivered to DTV system 170a using a terrestrial line (e.g., cable TV) or can be delivered via a wireless transmission mechanism (e.g., digital satellite system, etc.). In accordance with the present invention, a number of different and well known digital broadcast TV signal formats can be used to deliver the digital TV broadcast signal 150 to DTV system 170a. In one format, each channel of signal 150 has a bandwidth of approximately 19.2 Megabits per second (2.5 Megabytes per second) in which audio/visual and datacast information can reside. In one implementation, the American Television Standard Committee (ATSC) digital TV format is used. Several well known ATSC signal formats support datacast information transmission. In other embodiments, the Digital TV Applications Software Environment (DASE) signal format can be used.

The client-side DTV system 170a, of one embodiment, includes an intelligent client device ("intelligent device") 112 which is coupled to receive information from a user/viewer input device 106. The intelligent device 112, in one implementation, is a set-top-box and is also coupled (via bus 124) to a display device (e.g., a television) 105 for generating images and rendering sound. Optionally, separate speakers (not shown) can be used to generate the sound. The user/viewer input device 106 can be a number of different well known user input mechanisms including, for instance, a remote control, a physical keyboard, a mouse or other cursor directing device, a joystick, etc., and/or any combination of the above. The components of the intelligent device 112 are described in more detail with respect to FIG. 2.

DTV system 170a of FIG. 1A allows a viewer to see (e.g., browse) hypertext documents that are broadcast within encoded datacast information of the digital TV broadcast signal 150. The encoded datacast information can reside within a channel that also includes audio/visual programming or can reside within a channel dedicated to the transmission of digital datacast information. DTV system 170a of the present invention implements a mechanism for caching frequently visited hypertext documents (e.g., web pages) in a cache memory to enhance the internet connectivity experience of the viewer. Specifically, hypertext documents are cached in advance of being seen by the viewer. However, these documents are cached based on prior viewing behavior of the viewer. Digital TV broadcasting allows networks to broadcast datacast information (e.g., hypertext documents, HTML-based media and documents, web pages, etc.) over the digital TV signal. In accordance with the present invention, this digital information includes HTML-based documents related to (or not necessarily related to) the programming of the broadcaster. The present invention provides a viewer with a browser in the intelligent device 112 (e.g., set-top-box) or HDTV monitor. The system of the present invention is capable of storing (in cache memory) the latest versions of the hypertext documents visited by the viewer thereby allowing the viewer to access this information in a timely fashion.

The datacast information within the digital TV broadcast signal 150 is broadcast periodically. Within the system 170a of FIG. 1A, the digital TV broadcast signal 150 is therefore monitored by the intelligent device 112 for these hypertext documents. Based on the contents of an intelligent filter, those hypertext documents matching the filter are stored in a cache memory within the intelligent device 112. If a viewer should select a stored hypertext document (e.g., a cache hit) to view, then that selected hypertext document is obtained from the cache memory and displayed on display device 105. If the selected hypertext document is not stored in the cache memory (e.g., a cache miss occurs), then the intelligent device 112 access the selected hypertext document by monitoring the digital TV broadcast signal 150 until the hypertext document is next seen within the periodic broadcast.

Figure 1B:
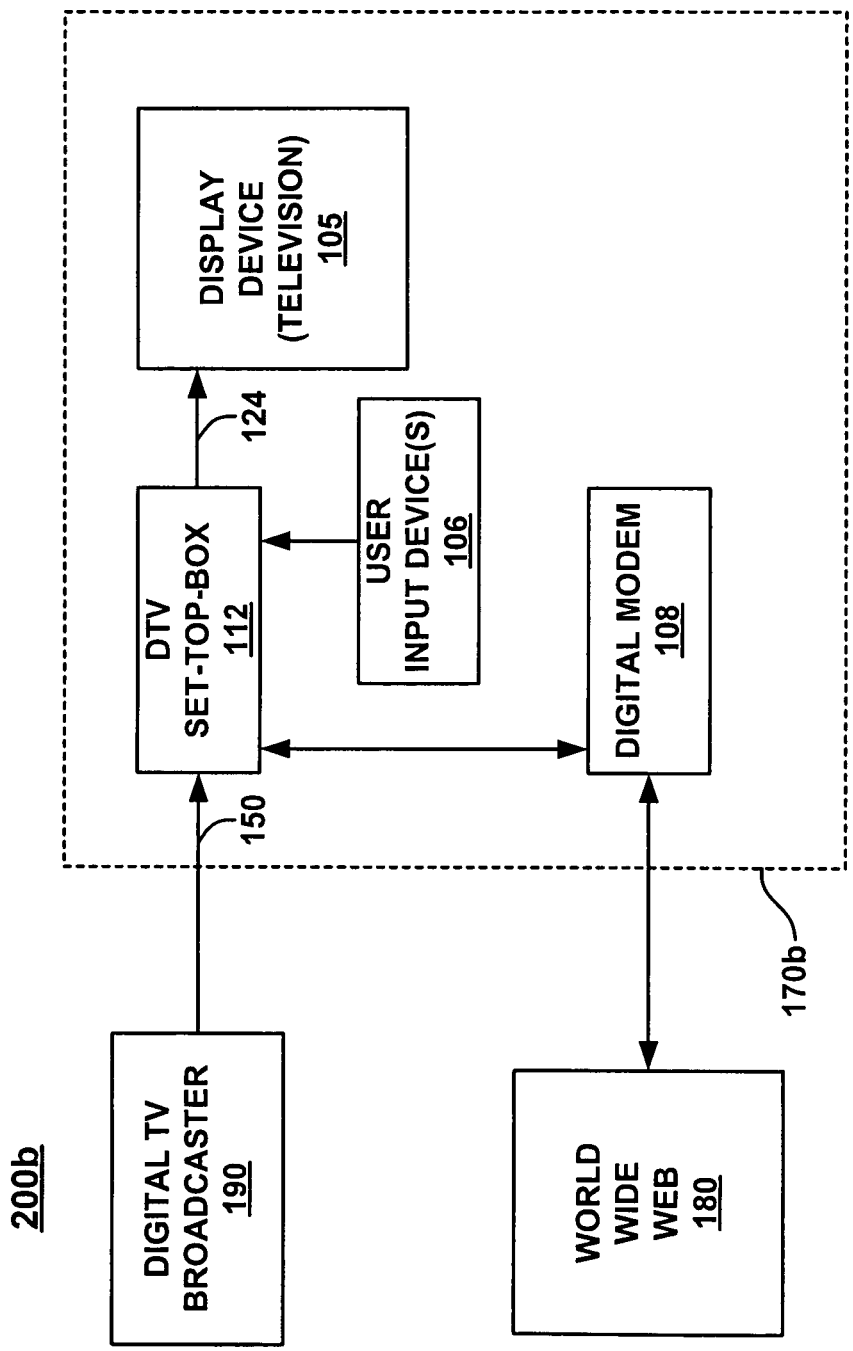
FIG. 1B illustrates a digital television system in accordance with a second embodiment of the present invention that includes a digital modem connection to the world wide web.

FIG. 1B illustrates an alternative embodiment of the present invention that includes a digital modem 108 as a second source for receiving hypertext documents. The digital mode 108 is capable of receiving hypertext documents from the internet. Client-side DTV system 170b includes the intelligent device 112 coupled to the digital modem 108 and to the user/viewer input device 106. The display device 105 is also coupled to the intelligent device 112. The digital modem 108 is coupled to the world wide web 180 that contains the internet protocol. Like the system 170a, system 170b of FIG. 1A is coupled to receive a digital TV broadcast signal 150 from a digital TV broadcaster 190. The broadcaster 190, the world wide web 180 and the client-side DTV system 170b together constitute system 200b.

System 170b operates in an analogous fashion as system 170a with one exception. Upon a cache miss, system 170b can use the digital modem 108 to obtain the selected web page or hypertext document rather than waiting for its next occurrence over the periodic broadcast of datacast information of the digital TV broadcast signal 150.

Broadcast of Datacast Information Within the Digital TV Broadcast Signal

With respect to system 170a and system 170b, the network broadcasters 190 broadcast a domain of hypertext documents in a periodic fashion, as discussed above. The number of documents within this domain is limited only by available channel bandwidth and expected latency. The document broadcast order is arbitrary, and typically established by the content provider. For instance, a 19.2 Megabit/second channel totally dedicated to the transmission of datacast information could broadcast about 200 hypertext documents per second. If a particular content provider wanted to establish a maximum latency of 20 seconds for any hypertext document, then about 200×20 or 4,000 hypertext documents would be the maximum number of documents within the domain for that channel. The broadcast order of the hypertext documents would be arbitrary and could be such that frequently visited documents get broadcast more often (e.g., with more frequency) than other lesser requested documents. In this case, different hypertext documents would have different maximum latencies.

However, many digital TV broadcast channels can share bandwidth between their audio/video information/programming and the datacast information. For instance, if a 19.2

Megabit/second channel contains audio, video and datacast information, it is likely that the datacast portion of the channel would contain far fewer than 200 documents/second because the bulk of the available channel width would be consumed by the audio/visual programming. This constraint would limit the document domain size for such a channel.

Hardware and Software Components of Intelligent Device (Computer System)

Figure 2:
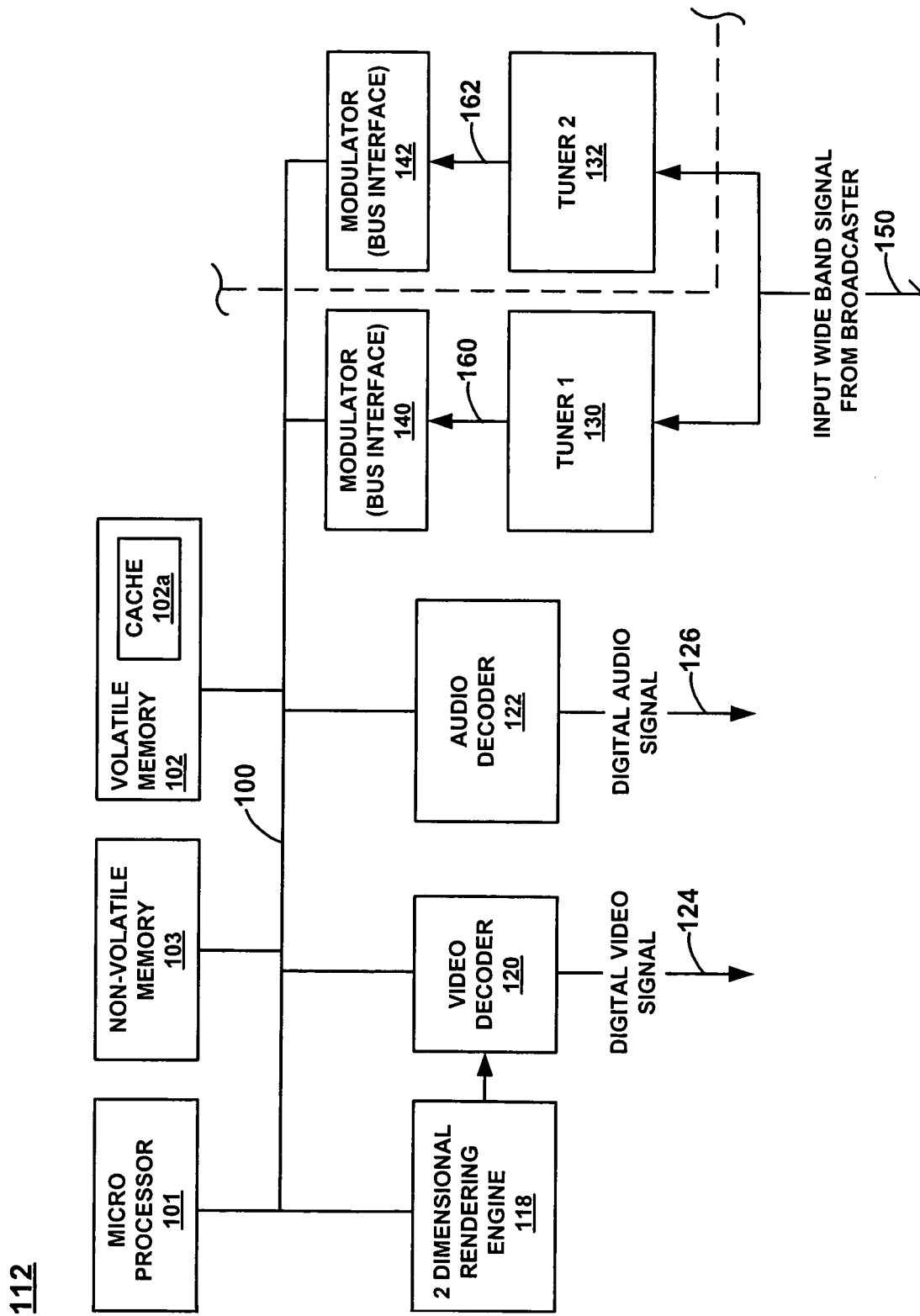
FIG. 2 is a logical block diagram of an intelligent client device in accordance with one embodiment of the present invention.

FIG. 2 illustrates the components of the intelligent device 112 in more detail. Any consumer electronic device can be provided with the appropriate computer system hardware to act as the intelligent device and thereby provide a platform for the processes of the present invention. For instance, a set-top-box device can be used. Another example of an intelligent device 112 is a digital television or computer system having the required hardware resources as described below. It is appreciated that certain aspects of the present invention, described below, are discussed in terms of steps executed on the intelligent device 112 (e.g., processes 400, 450, 480, 500a and 500b). Although a variety of different computer systems can be used as the intelligent device 112, an exemplary system is shown in FIG. 2.

Intelligent device 112 of FIG. 2 includes an internal address/data bus 100 for communicating digital information, one or more central processors 101 coupled with the bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. A cache memory 102a resides within memory 102. As discussed more fully below, hypertext documents matching an intelligent filter are stored into the cache memory 102a for later use by the viewer. Intelligent device 112 can also optionally include a data storage device (not shown) such as a magnetic or optical disk and disk drive coupled with the bus 100 for storing information and instructions. The intelligent filter discussed above is a memory resident data structure and therefore may reside within memory 102.

Intelligent device 112 also includes a video decoder 120 coupled to bus 100 and coupled to supply a digital video signal 124 (e.g., to digital display device 105). A number of well known video decoders can be used for video decoder 120. Intelligent device 112 also includes an audio decoder 122 (e.g., a sound card) that is coupled to bus 100 and generates a digital audio signal over bus 126 (which can be coupled to external speakers). The video decoder 120 processes video information from bus 100 and the audio decoder 122 processes digital audio information from bus 100. Any of a number of well known audio decoders can be used for audio decoder 122 of the present invention. In one embodiment of the present invention, a two dimensional rendering engine 118 is also coupled to the bus 100 and coupled to the video decoder. The two dimensional rendering engine 118 processes graphics information and supplies the output as an overlay to the video decoder. In this way, graphics information can efficiently be overlaid with the other video information (including hypertext documents).

Digital TV broadcast information is received and processed by the intelligent device 112 from tuner 130 which is coupled to receive the digital TV broadcast signal 150. Optionally, a second tuner 132 can also be used to receive digital TV broadcast information. In one embodiment of the present invention, the second tuner 132 is not used. The first tuner 130 is coupled to a modulator 140 via bus 160 and the modulator 140 is coupled to bus 100. The modulator 140 performs analog to digital conversion of the signals of bus 160 and also acts as a bus interface for bus 100. The modulator 140 and the tuner 130 are well known. In an alternative embodiment, the second tuner 132 is coupled to a modulator 142 via bus 162 and the modulator 142 is coupled to bus 100. The modulator 142 performs analog to digital conversion of the signals of bus 162 and also acts as a bus interface for bus 100.

As discussed further below, the first tuner 130 is used for processing digital information used in foreground processing tasks. For instance, the first tuner 130 is controlled by the viewer and its contents are displayed in real-time on the television screen 105 for the viewer to enjoy. However, the second tuner 132 is used to perform background processing to maintain the contents of the cache 102a. In the embodiment that does not utilize the second tuner 132, the first tuner 130 is used to perform both the foreground and background tasks.

Figure 3:
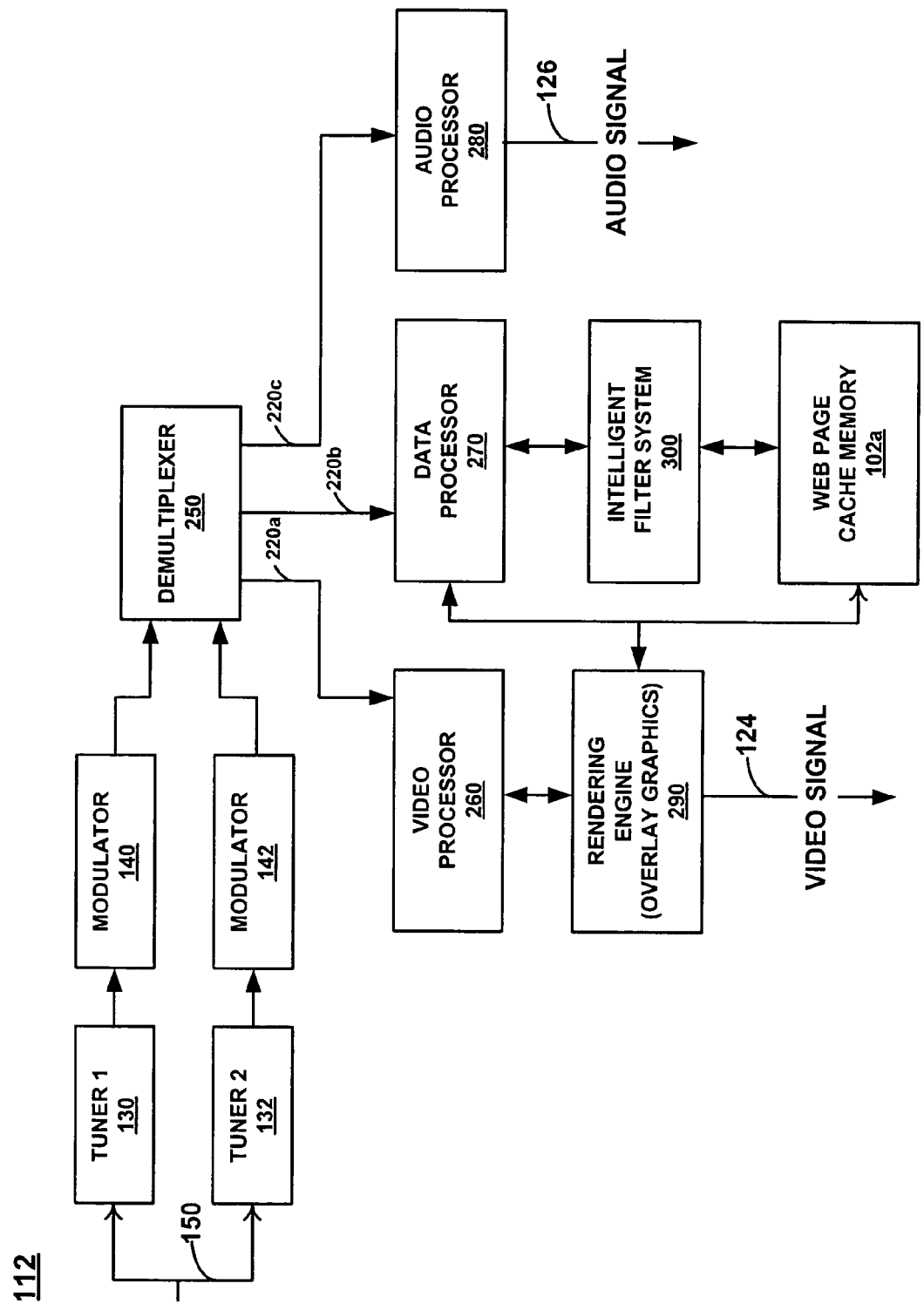
FIG. 3 is a hardware and software data flow diagram of the logical components of the intelligent client device of the present invention.

Under processor control from processor 101, digital audio/video information received from tuner 130 are directed over bus 100 to video decoder 120 and to audio decoder 122 for rendering on the display 105 and speakers via bus 124 and bus 126. It is appreciated that bus 124 and bus 126 can be merged into one single larger digital bus carrying both video and audio data signals. Under processor control from processor 101, digital audio/video information received from optional tuner 132 are directed over bus 100 and are initially processed by an intelligent processor as shown in FIG. 3. Hypertext documents from tuner 132 can be stored in cache memory 102a and if selected, are then transmitted on bus 100 to video decoder 120 and to audio decoder 122, as discussed above.

FIG. 3 illustrates a data flow diagram of the intelligent controller 112 including hardware and software components. Tuner 130 and tuner 132 receive digital TV information from digital TV broadcast signal 150. Modulator 140 receives analog information from tuner 130 and generates a digital signal which is received by a demultiplexer 250. Modulator 142 receives analog information from tuner 132 and generates a digital signal which is received by a demultiplexer 250. Demultiplexer 250 can be hardware or software implemented and sorts out the audio, video and datacast portions of the digital signals received from the modulators 140 and 142. Digital video information is forwarded from demultiplexer 250 over data path 220a to a video processor 260. Video processor 260 can be software implemented, or alternatively, can be implemented in hardware, or can be a combination of both. Video processor 260 includes a video decoder 120 capable of decoding encoded video signals in well known formats such as MPEG (Motion Picture Expert Group) and MPEG II.

As discussed above, video processor 260 interfaces with a two dimensional rendering engine 290 which can be a hardware unit (as shown in FIG. 2) or can be implemented as a software process as shown in FIG. 3. Rendering engine 290 interfaces with both the video processor 260 and with a data processor 270 to overlay graphics information. Rendering engine 290 also directly interfaces with the cache memory 102a. The digital video signals are output over bus 124. Demultiplexer 250 also forwards digital audio signals over data path 220c to the audio processor 280 which generates audio signals over bus 126.

Demultiplexer 250 of FIG. 3 also forwards digital datacast information over data path 220b to the data processor 270 which processes hypertext documents. Data processor 270 contains a browser. Any of a number of well known browsers, e.g., as commercially available from Netscape or Microsoft, can be used by data processor 270. Hypertext documents are rendered by data processor 270 and shipped to the rendering engine 290 for display over bus 124. An intelligent filter 300 is coupled to the data processor 270. Data processor 270 also directly interfaces with the cache memory 102a. In accordance with the present invention, intelligent filter 300 is a software unit and receives an identifier of each hypertext document received by data processor 270. In one embodiment, the identifier is the web address of a web page. The intelligent filter 300 has recorded therein a listing of identifiers corresponding to frequently visited web pages. This information is compiled based on past viewer behavior.

The intelligent filter 300 stores into cache memory 102a each hypertext document that is received by data processor 270 and that also matches an identifier stored in the intelligent filter 300. Hypertext documents not within the intelligent filter 300 are not stored in the cache memory 102a. The size of the cache memory 102a depends on the number of hypertext documents that are desired for storage and typically becomes an implementation choice depending on available memory resources. A 10 Megabyte cache memory 102a can store about 1,000 web pages.

Caching Processes of the Present Invention

Figure 4:
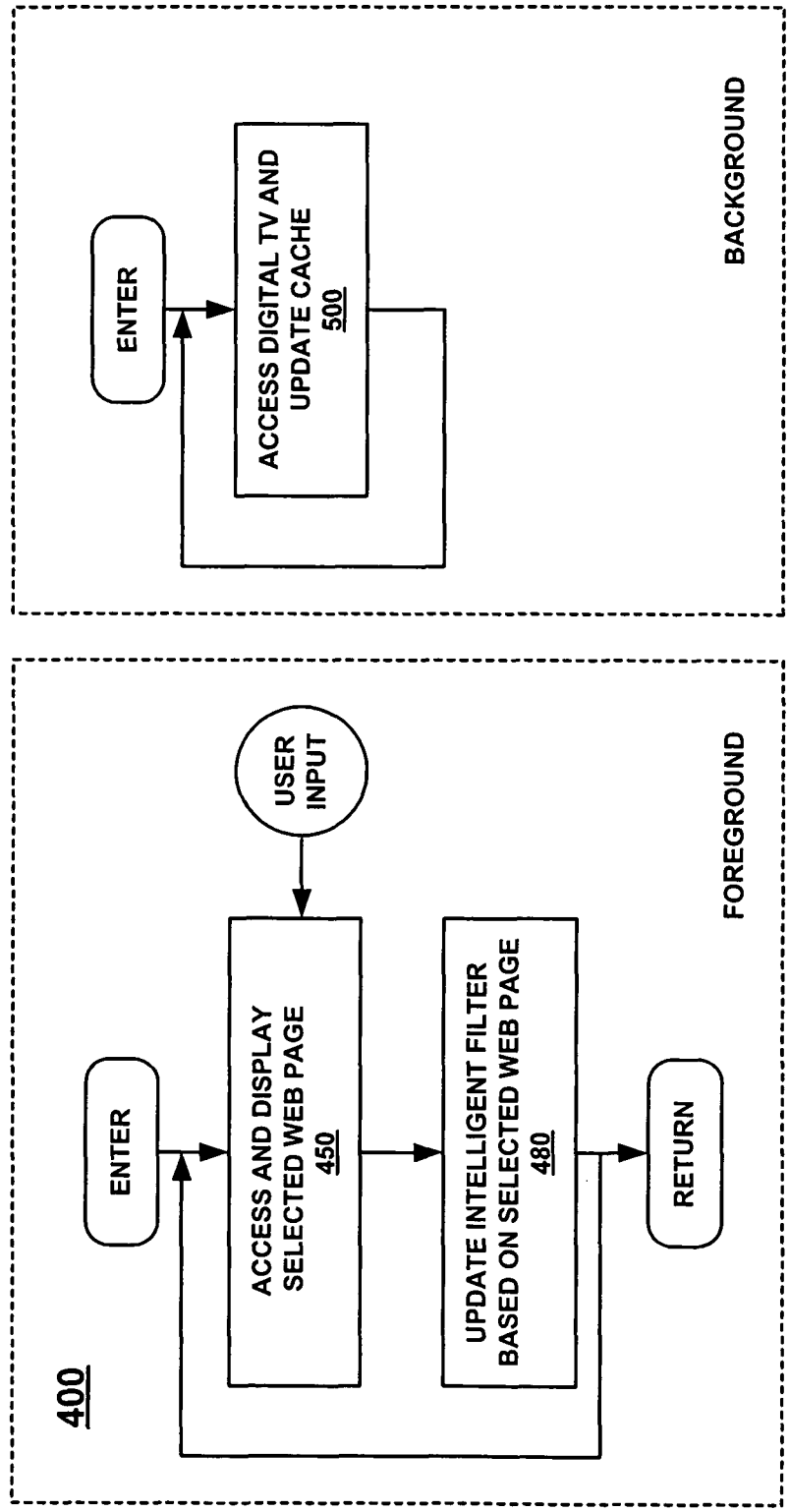
FIG. 4 illustrates the background and foreground processes implemented within the intelligent client device of the present invention.

FIG. 4 illustrates the major processes of the present invention to implement a digital TV web caching system. Process 400 is the foreground process and responds to a user/viewer selecting a particular web page or other hypertext document for display. At step 450, the intelligent device 112 accesses and displays a selected web page. At step 480, the intelligent filter 300 is then updated based on the user/viewer selections. In this way, the intelligent filter 300 is updated based on the behavior and viewing patterns/history of the user. Process 400 then repeats.

In the background, process 500 updates the cache memory 102a based on information received over the digital TV broadcast signal and based on the contents of the intelligent filter 300. Process 500 is cyclic. It is appreciated that the intelligent device 112 caches web pages based on the intelligent filter 300 and that this caching activity occurs in the background. It is appreciated that the present invention performs "forward" caching in that web pages and other hypertext documents are cached before they are viewed using the browser. It is further appreciated that both process 400 and process 500 are implemented as instructions stored within computer readable memory units of intelligent device 112 and executed on processor 101.

Figure 5:
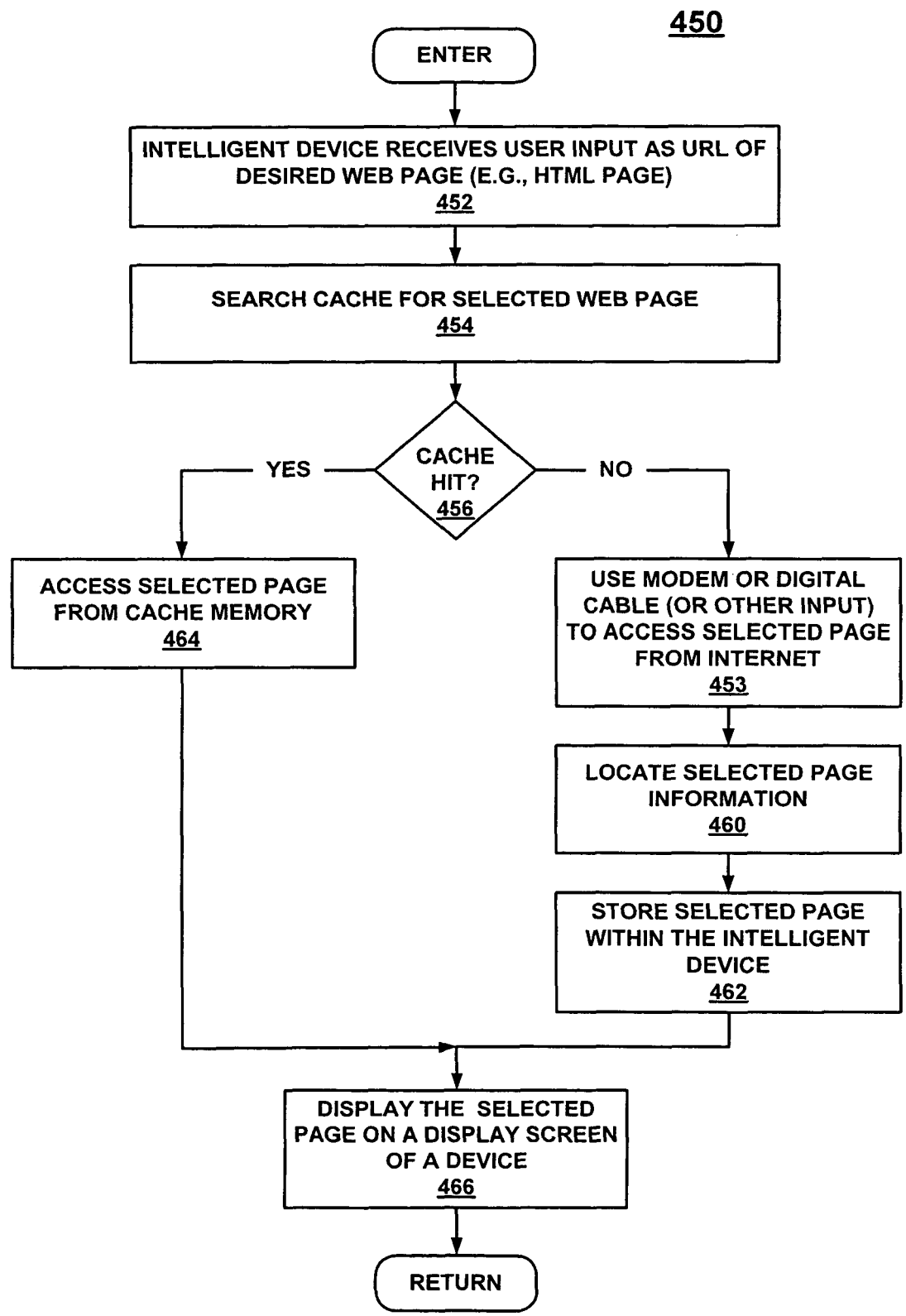
FIG. 5 is a flow diagram illustrating steps of the foreground process of the intelligent client device of the present invention for accessing and displaying selected web pages and other hypertext documents.

FIG. 5 is a flow diagram illustrating the steps within foreground process 450. At step 452, the intelligent device 112 receives a user/viewer originated request for a particular desired hypertext document (e.g., a particular web page). This request typically is received in the form of a web page address typed in (or otherwise selected) by a viewer using the user input device 106. At step 454, the present invention checks the contents of the cache memory 102a to determine if this hypertext document is currently stored in the cache memory 102a. At step 456, a check is made if a cache hit occurs (e.g., the selected hypertext document is stored in the cache memory 102b) or if a cache miss occurs (e.g., the selected hypertext document is not stored in the cache memory 102b).

If a cache hit occurs at step 456, then process 450 flows to step 464 where the intelligent device 112 obtains the selected hypertext document from cache memory 102a. At step 466, the intelligent device 112 then displays the selected hypertext document on the digital display screen 105. Upon a cache hit, no latency is perceived by the user from step 452 to step 466. Process 450 then returns.

If a cache miss occurs at step 456, then process 450 flows to step 458. At step 458, if the DTV system of the present invention contains a digital modem, it can optionally be used to obtain the selected hypertext document from the internet. Within the preferred embodiment, the DTV system of the present invention, at step 458, uses the digital TV broadcast signal 150 to obtain the selected hypertext document. At this step, the DTV system monitors the digital TV broadcast signal 150 until its periodic broadcast transmits the selected hypertext document. At step 458, a latency can be detected by the viewer between the request and the display of the selected hypertext document. The duration of the latency depends on the maximum latency for hypertext documents as determined by the content provider of the currently tuned channel. The latency is also determined by the timing of step 458 within the periodic broadcast of hypertext documents. At step 460 and step 462, the selected hypertext document is located and it is stored within a memory unit of the intelligent device 112. At step 466, the selected hypertext document is then displayed on the digital screen. Process 450 then returns.

The provision of the cache memory 102a therefore increases the user's internet connectivity experience, in accordance with the present invention, by eliminating any perceived latencies for selected web pages that are associated with a cache hit.

Figure 6:
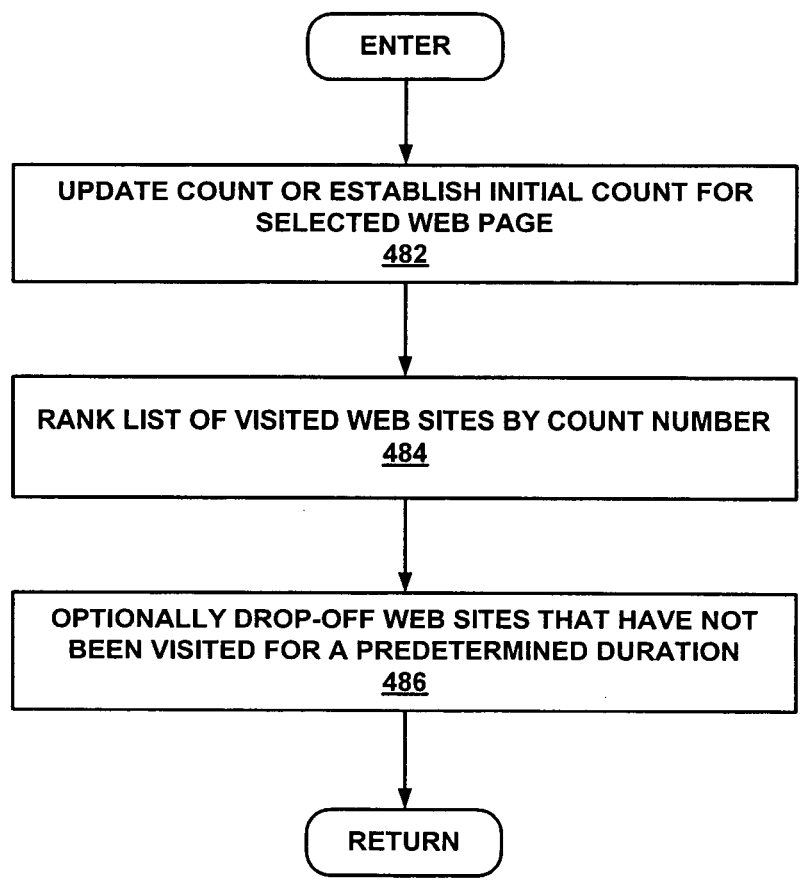
FIG. 6 is a flow diagram illustrating steps of the foreground process of the intelligent client device of the present invention for updating the intelligent filter based on viewer preferences and behavior, e.g., viewer history.

FIG. 6 is a flow diagram illustrating the steps within foreground process 480 for updating the intelligent filter 300 based on user/viewer behavior. At step 482, if the currently selected hypertext document is not recorded in the intelligent filter 300, then it is recorded with an associated initial count (e.g., 1). At step 482, if the currently selected hypertext document is already recorded in the intelligent filter 300, then its associated count is incremented by one. In either case, an identifier of the selected hypertext document is recorded in the intelligent filter 300. At step 482, if the intelligent filter 300 becomes filled, as new hypertext documents are recorded, those recorded hypertext documents with the lowest count are dropped off. Optionally, at step 482, a timestamp is recorded with each recorded hypertext document indicating the time and date that the user last visited the web page.

At step 484, the present invention then ranks all of its recorded entries by count number with those hypertext documents with the largest count placed higher in the recorded list. At step 486, the present invention then optionally drops off of the recorded list any hypertext document that has not been visited by the viewer for a predetermined time period. This optional function is facilitated by the timestamps discussed above.

Figure 7A:
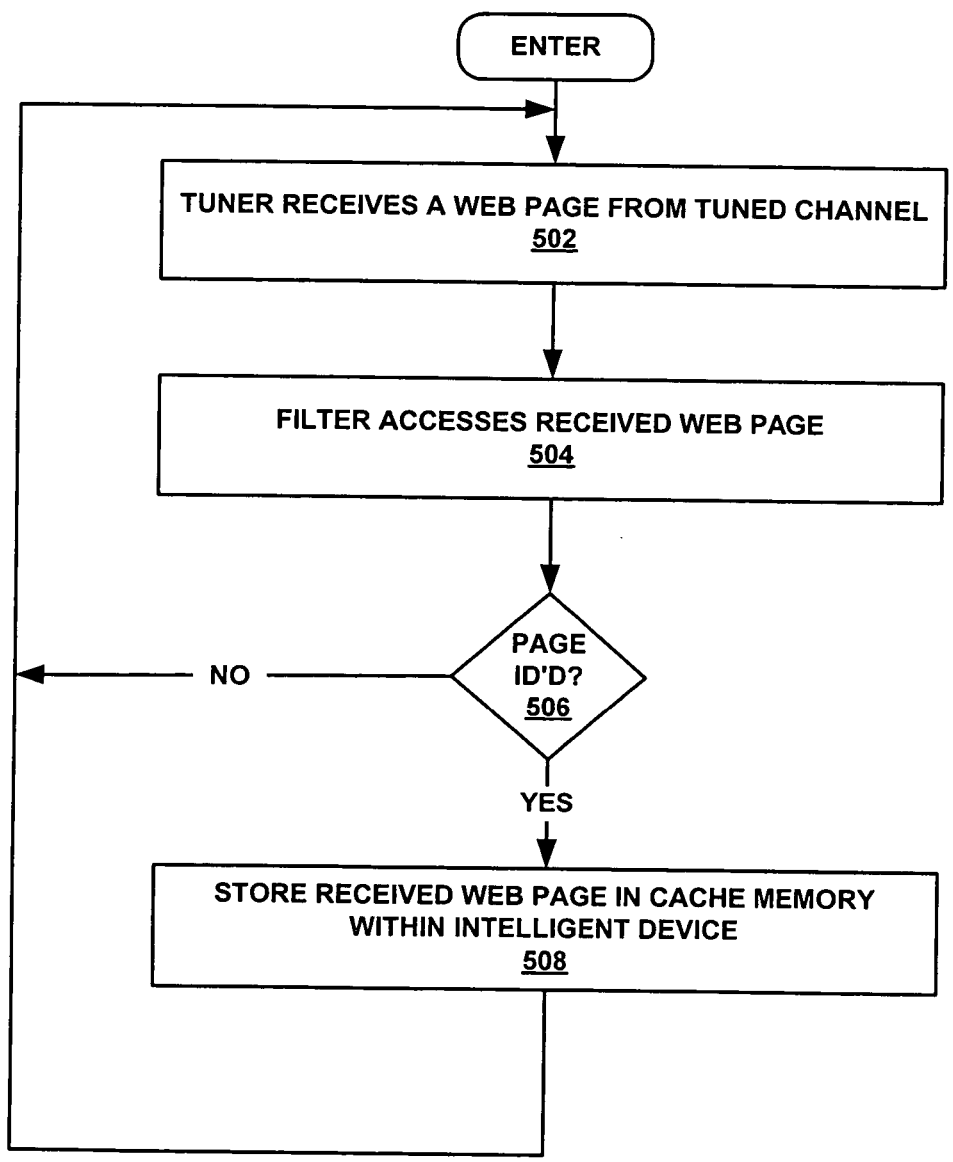
FIG. 7A illustrates steps in the background process of one embodiment of the present invention for storing web pages and other hypertext documents in the cache memory of the intelligent client device.
Figure 7B:
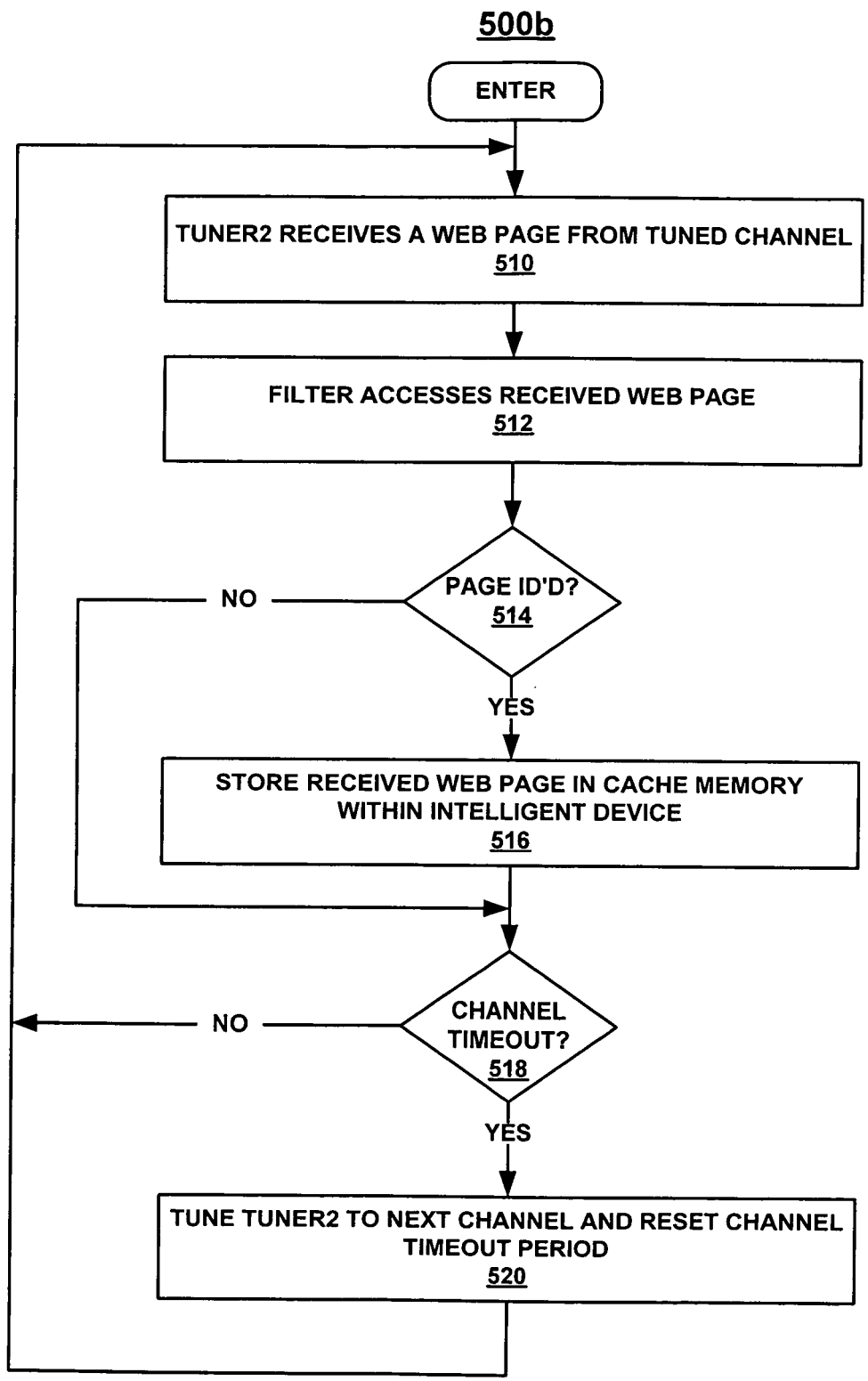
FIG. 7B illustrates steps in the background process of a two-tuner embodiment of the present invention for storing web pages and other hypertext documents in the cache memory of the intelligent client device.

FIG. 7A and FIG. 7B illustrate two different versions of background process 500 for filling the cache memory 102a. Process 500a and process 500b are "background" processes in that they operate constantly whether or not the user/viewer is interacting with the DTV system. Process 500a of FIG. 7A corresponds to DTV system 170a (FIG. 1A) that has one tuner. Process 500b of FIG. 7B is used with DTV system 170b (FIG. 1B) that contains two tuners.

Process 500a of FIG. 7A commences at step 502 where the first tuner 130 receives a web page or other hypertext document from the currently tuned channel of the digital TV broadcast signal 150. The viewer can alter the currently tuned channel at any time while process 500a is operating. During TV watching periods, the information received by tuner 130 is displayed in real-time on the display screen 105. At step 504, the intelligent device 112 compares the encoded identifier of the received hypertext document (e.g., the web page address) against the identifiers that are recorded in the intelligent filter 300. At step 506, if a match occurs then step 508 is entered, otherwise, step 502 is entered and this process continues for the next received hypertext document of the currently tuned channel.

At step 508, the intelligent device 112 receives and stores the current hypertext document into the cache memory 102a. If a previous older copy of the hypertext document is stored in the cache memory 102a, then at step 508, the present invention replaces the old copy with the new copy. If a previous same copy of the hypertext document is stored in the cache memory 102a, then at step 508, the present invention ignores the current hypertext document. It is appreciated that each hypertext document contains an identifier that can be used to determine if one hypertext document is the same or an older or a newer version of another hypertext document. After step 508 completes, step 502 is entered again to process the next received hypertext document. As described above, process 500a is limited in that only the currently tuned channel (e.g., that is also used by the viewer) is used to update cache memory 102a.

FIG. 7B illustrates the steps of process 500b. Process 500b utilizes the second tuner 132 to update the cache memory 102a by continuously polling the available channels in a round robin fashion to update the cache memory 102a. In this way, the particular program selected by the viewer does not limit the scope of information that can be used to update the cache memory 102a. In other words, process 500b allows the cache memory 102a to be updated based on information that is being broadcast over one channel (e.g., using tuner 132) while the viewer is currently watching a program, or viewing other media information, on another channel (e.g., using tuner 130).

At step 510 of FIG. 7B, the present invention receives datacast information over the channel that is currently tuned by the second tuner 132. The user/viewer is not allowed to alter the channel being tuned by tuner 132. Only the processor 101 of the intelligent device 112 can alter tuner 132 by program control. At step 510, a hypertext document is received by the intelligent device 112 from the second tuner 132. At step 512, the intelligent device 112 compares the encoded identifier of the received hypertext document (e.g., the web page address) against the identifiers that are recorded in the intelligent filter 300. At step 514, if a match occurs then step 516 is entered, otherwise, step 518 is entered.

At step 516, the intelligent device 112 receives and stores the current hypertext document into the cache memory 102a. If a previous older copy of the hypertext document is stored in the cache memory 102a, then at step 516, the present invention replaces the old copy with the new copy. If a previous same copy of the hypertext document is stored in the cache memory 102a, then at step 516, the present invention ignores the current hypertext document. It is appreciated that each hypertext document contains an identifier that can be used to determine if one hypertext document is the same or an older or a newer version of another hypertext document. After step 516 completes, step 518 is entered.

At step 518, the intelligent device 112 checks if a predetermined time period has expired. Each available channel is scanned according to process 500b only for a predetermined time period. Once this time period expires, a new channel is used. At step 518, the present invention determines if the time period for the currently tuned channel has expired. If not, then step 510 is entered and the next hypertext document is received from the same tuned channel. In one implementation, the time period is 20 seconds for each channel but could be any reasonable period or could be programmable or could vary from channel to channel.

At step 518, if the time period for the currently tuned channel expires, then at step 520 the second tuner 132 is tuned to the next channel and the time period is reset. Step 510 is then entered to obtain the next hypertext document from the newly tuned channel. Process 500b repeats in this fashion. It is appreciated that the user can tune tuner 130 to any channel at any time during process 500b and this action will not alter the results of process 500b. Therefore, process 500b is not limited to the particular channel being watched by the user (e.g., via tuner 130).

The preferred embodiment of the present invention, an intelligent device within a digital television system for performing background caching of web pages, is thus described. While the present invention has been described in particular embodiments, it should be appreciated that the present invention should not be construed as limited by such embodiments, but rather construed according to the below claims.

What is claimed is:

1. A method of managing digital content in a digital electronic system, said method comprising:
    scanning a first channel for a time period for a first portion of digital content;
    responsive to not detecting the first portion of digital content during the time period, ceasing scanning the first channel and scanning a second channel for the first portion of digital content;
    responsive to detecting the first portion of digital content during the time period, accessing the first portion of digital content using the first channel, wherein said first channel is selected under program control by a component of said digital electronic system;
    comparing a first unique identifier to a plurality of unique identifiers to determine whether said plurality of unique identifiers comprises said first unique identifier, wherein said first unique identifier is associated with said first portion of digital content and wherein the plurality of unique identifiers is established based on past user downloading of digital content and not on user input of preferences;
    responsive to a determination that said plurality of unique identifiers comprises said first unique identifier, storing said first portion of digital content in a memory of said digital electronic system, wherein said storing is performed contemporaneously with a processing of other content accessed using a second channel;
    responsive to a user request for a second portion of digital content,
    determining if said second portion of digital content is stored in said memory; and
    accessing said second portion of digital content from said memory responsive to a determination that said second portion of digital content is stored in said memory otherwise accessing said second portion of digital content over the Internet.

2. The method of claim 1 further comprising:
    recording a plurality of counts associated with said plurality of unique identifiers, wherein each of said plurality of counts is associated with a number of times a respective portion of digital content has been accessed by said digital electronic system; and
    ranking said plurality of unique identifiers based on said plurality of counts.

3. The method of claim 2 further comprising:
    determining, based on said plurality of counts, that said second portion of digital content has been accessed fewer times than said first portion of digital content; and responsive to said determining, removing said second unique identifier from said plurality of unique identifiers.

4. The method of claim 1 further comprising:
recording a plurality of timestamps associated with said plurality of unique identifiers, wherein each of said plurality of timestamps is associated with a respective time at which a respective portion of digital content has been accessed by said diaital electronic system:
determining, based on said plurality of timestamps, that said second portion of digital content has not been accessed by said digital electronic system for a predetermined period of time; and
responsive to said determining, removing said second unique identifier from said plurality of unique identifiers.

5. The method of claim 1 further comprising:
supplying said second portion of digital content for display on a display device.

6. The method of claim 1, wherein said first portion of digital content is selected from a group consisting of audio and video.

7. The method of claim 1, wherein said user request is input to said digital electronic system via an input device, and wherein said input device is selected from a group consisting of a remote control, a keyboard, a mouse, a cursor directing device, and a joystick.

8. A system comprising a processor and a memory, wherein said memory comprises instructions that when executed by said system implement a method of managing digital content in a digital electronic system, said method comprising:
accessing a first portion of digital content using a first channel, wherein said first channel is selected under program control by a component of said digital electronic system;
comparing a first unique identifier to a plurality of unique identifiers to determine whether said plurality of unique identifiers comprises said first unique identifier, wherein said first unique identifier is associated with said first portion of digital content wherein the plurality of unique identifiers is established based on past user downloading of digital content and not on user input of preferences;
responsive to a determination that said plurality of unique identifiers comprises said first unique identifier, storing said first portion of digital content in said digital electronic system, wherein said storing is performed contemporaneously with a processing of other content accessed using a second channel; and
responsive to a user request for a second portion of digital content, accessing said second portion of digital content from the digital electronic system if said second portion of digital content is stored in said digital electronic system, otherwise accessing said second portion of digital content over the Internet.

9. The system of claim 8, wherein said method further comprises:
recording a plurality of counts associated with said plurality of unique identifiers, wherein each of said plurality of counts is associated with a number of times a respective portion of digital content has been accessed by said digital electronic system; and
ranking said plurality of unique identifiers based on said plurality of counts.

10. The system of claim 9, wherein said method further comprises:
determining, based on said plurality of counts, that said second portion of digital content has been accessed fewer times than said first portion of digital content; and
responsive to said determining, removing said second unique identifier from said plurality of unique identifiers.

11. The system of claim 8, wherein said method further comprises:
recording a plurality of timestamps associated with said plurality of unique identifiers, wherein each of said plurality of timestamps is associated with a respective time at which a respective portion of digital content has been accessed by said digital electronic system;
determining, based on said plurality of timestamps, that said second portion of digital content has not been accessed by said digital electronic system for a predetermined period of time; and
responsive to said determining, removing said second unique identifier from said plurality of unique identifiers.

12. The system of claim 8, wherein said method further comprises:
supplying said second portion of digital content for display on a display device.

13. The system of claim 8, wherein said first portion of digital content is selected from a group consisting of audio and video.

14. The system of claim 8, wherein said user request is input to said digital electronic system via an input device, and wherein said input device is selected from a group consisting of a remote control, a keyboard, a mouse, a cursor directing device, and a joystick.

15. A computer-readable memory having computer-readable program code embodied therein for causing a computer system to perform a method of managing digital content in a digital electronic system, said method comprising:
accessing a first portion of digital content using a first channel, wherein said first channel is selected under program control by a component of said digital electronic system;
comparing a first unique identifier to a plurality of unique identifiers to determine whether said plurality of unique identifiers comprises said first unique identifier, wherein said first unique identifier is associated with said first portion of digital content, wherein the plurality of unique identifiers is established based on past user downloading of digital content and not on user input of preferences;
responsive to a determination that said plurality of unique identifiers comprises said first unique identifier, storing said first portion of digital content in a memory of said digital electronic system, wherein said storing is performed contemporaneously with a processing of other content accessed using a second channel;
responsive to a user request for a second portion of digital content,
determining if said second portion of digital content is stored in said memory; and
accessing said second portion of digital content from said memory if said second portion of digital content is stored in said memory otherwise accessing said second portion of digital content over the internet.

16. The computer-readable memory of claim 15, wherein said method further comprises:
recording a plurality of counts associated with said plurality of unique identifiers, wherein each of said plurality of counts is associated with a number of times a respective portion of digital content has been accessed by said digital electronic system; and ranking said plurality of unique identifiers based on said plurality of counts.

17. The computer-readable memory of claim 16, wherein said method further comprises:

determining, based on said plurality of counts, that said second portion of digital content has been accessed fewer times than said first portion of digital content; and responsive to said determining, removing said second unique identifier from said plurality of unique identifiers.

18. The computer-readable memory of claim 15, wherein said method further comprises:

recording a plurality of timestamps associated with said plurality of unique identifiers, wherein each of said plurality of timestamps is associated with a respective time at which a respective portion of digital content has been accessed by said digital electronic system;

determining, based on said plurality of timestamps, that said second portion of digital content has not been accessed by said digital electronic system for a predetermined period of time; and responsive to said determining, removing said second unique identifier from said plurality of unique identifiers.

19. The computer-readable memory of claim 15, wherein said method further comprises:

supplying said second portion of digital content for display on a display device.

20. The computer-readable memory of claim 15, wherein said first portion of digital content is selected from a group consisting of audio and video.

21. The computer-readable memory of claim 15, wherein said user request is input to said digital electronic system via an input device, and wherein said input device is selected from a group consisting of a remote control, a keyboard, a mouse, a cursor directing device, and a joystick.

* * * * *